M. P. SCHELL.
NON-REFILLABLE BOTTLE.
APPLICATION FILED NOV. 14, 1911.
1,019,535.
Patented Mar. 5, 1912.
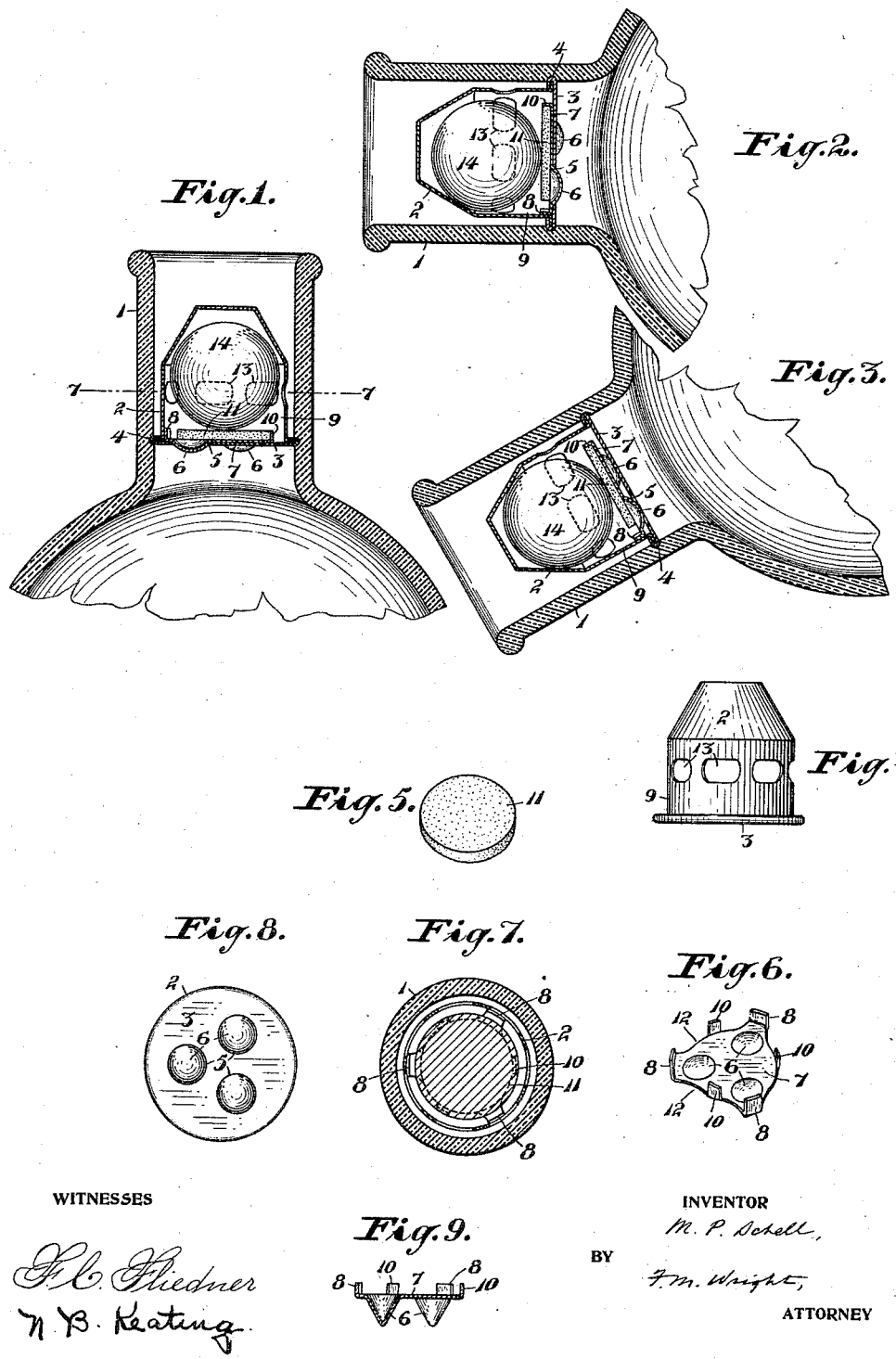
WITNESSES
INVENTOR
M. P. Schell,
BY
F. M. Wright,
ATTORNEY

UNITED STATES PATENT OFFICE.

MAX P. SCHELL, OF SAN FRANCISCO, CALIFORNIA, ASSIGNOR TO CHRISTOPHER H. KOBICKE, OF SAN FRANCISCO, CALIFORNIA.

NON-REFILLABLE BOTTLE.

1,019,535.      Specification of Letters Patent.      Patented Mar. 5, 1912.

Application filed November 14, 1911. Serial No. 660,216.

*To all whom it may concern:*

Be it known that I, MAX P. SCHELL, a citizen of the United States, residing at San Francisco, in the county of San Francisco and State of California, have invented new and useful Improvements in Non-Refillable Bottles, of which the following is a specification.

The present invention relates to improvements in non-refillable bottles.

One of the most important requisites of a stopper for making a bottle non-refillable is that it should be capable of being made at a very small cost. Consequently such a stopper must be capable of being made by stamping, or otherwise forming the device almost wholly by machinery, and with a minimum employment of hand labor for the individual stoppers.

The object of the present invention is to provide a stopper for a non-refillable bottle which can be so manufactured and which will effectively accomplish the work for which it is intended.

In the accompanying drawing, Figure 1 is a vertical section of the neck of a bottle in an upright position having my improved stopper therein; Fig. 2 is a similar view showing the neck in a horizontal position; Fig. 3 is a similar view showing the neck in a partly inverted position; Fig. 4 is an outside view of the stopper casing; Fig. 5 is a perspective view of the cork float; Fig. 6 is a perspective view of the valve removed; Fig. 7 is a horizontal section on the line 7—7 of Fig. 1; Fig. 8 is a bottom plan view of the valve; Fig. 9 is a horizontal sectional view of a modified form of valve.

Referring to the drawing, 1 indicates the neck of a bottle, in which is secured my improved stopper. Said stopper comprises a main casing 2, and a base 3, best shown in Fig. 3, the edge of which base is spun around the lower edge of the casing 2. The edge of the base thus forms a circular rib which is contained in a groove 4 in the neck of the bottle. Said base is formed with a plurality of circular holes 5, three being here shown, through which holes the liquid contents of the bottle are discharged. Said holes are closed by valves 6, which are of such form as to exactly fit within, and tightly close, the holes, being either of a spherical form, as shown in Fig. 8, or conical as shown in Fig. 9. These valves are formed integral with a plate 7, which is formed with arms 8 fitting closely within the lower cylindrical wall 9 of the casing 2, and serving as guide arms for the movement of the valve plate in said casing. Said valve plate is also formed with prongs 10, which closely surround a cork disk 11, which thus serves as a float. The edge of the plate between the guide arms 8 is recessed, as shown at 12 to allow the liquid to flow past said edge.

The casing is formed with apertures 13 by which the liquid passes from within the casing to the annular space between the casing and the neck of the bottle, then flowing out of said neck in the ordinary manner. Within the casing is a ball 14 of heavy material, which in the upright position of the bottle maintains the holes 5 closed by the valves 6. The size of the casing is so proportioned to the diameter of the ball, that the valve plate cannot move away from the base so far that the valves of said valve plate are entirely outside the respective holes 5. Consequently, in the movement of the valve plate toward the base, said valves are always centered and seat themselves in said holes.

I am aware that it has been proposed to use a casing having a base similar to the base 3 formed with openings, which are closed by hollow spheres of light material contained within a cage therefor. The cost of manufacturing these balls or spheres accurately, so that they always fit tightly within the holes, is, however, very considerable, and does not permit of, the stopper being manufactured at the low cost required for successful commercial introduction. I overcome this objection by, in effect using only a portion of each spherical valve and forming said portion integral with a plate provided with means for guiding it within the casing. A further advantage of this construction is that thereby the whole device is reduced in height, thus also reducing the cost of material. A further advantage of my improvement is that, whereas, in the former construction, it is necessary to use a base plate having a wide flange, constituting a cap, in my present construction the edge of the base is merely spun around the lower edge of the casing, which construction also greatly reduces the cost.

I claim:—

1. In a non-refillable bottle, the combination, with the neck of a bottle, of an apertured casing in said neck having a base formed with a plurality of circular openings, corresponding valves adapted to project through said openings to close the same, a plate formed integral with all of said valves, and a ball in said casing on said plate.

2. In a non-refillable bottle, the combination, with the neck of a bottle, of an apertured casing in said neck having a base formed with a plurality of circular openings, corresponding valves adapted to project through said openings to close the same, a plate formed integral with all of said valves, and formed at the edge with guide arms for guiding it in said casing, and a ball in said casing on said plate.

3. In a non-refillable bottle, the combination, with the neck of a bottle, of an apertured casing in said neck having a base formed with a plurality of circular openings, corresponding valves adapted to project through said openings to close the same, a plate formed integral with all of said valves, and a ball in said casing on said plate, said casing being of such size and form relatively to the diameter of the ball as to prevent the vertical movement of the ball permitting said valves to be moved from said openings to the full depth of the valves, while permitting said valves to move from said openings.

In testimony whereof I have hereunto set my hand in the presence of two subscribing witnesses.

MAX P. SCHELL.

Witnesses:
FRANCIS M. WRIGHT,
D. B. RICHARDS.

Copies of this patent may be obtained for five cents each, by addressing the "Commissioner of Patents, Washington, D. C."